United States Patent
Chung et al.

(10) Patent No.: US 8,584,306 B2
(45) Date of Patent: Nov. 19, 2013

(54) ROBOT CLEANER AND METHOD FOR CONTROLLING THE SAME

(75) Inventors: Woo Ram Chung, Seoul (KR); Jae Man Joo, Suwon-si (KR); Dong Won Kim, Hwaseong-si (KR); Jun Pyo Hong, Suwon-si (KR); Jae Young Jung, Suwon-si (KR); Kyung Hwan Yoo, Suwon-si (KR); Hwi Chan Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 656 days.

(21) Appl. No.: 12/659,401

(22) Filed: Mar. 8, 2010

(65) Prior Publication Data
US 2010/0288307 A1 Nov. 18, 2010

(30) Foreign Application Priority Data
May 14, 2009 (KR) .................. 10-2009-0042029

(51) Int. Cl.
*A47L 5/00* (2006.01)
(52) U.S. Cl.
USPC .......................................................... 15/319

(58) Field of Classification Search
USPC ............ 15/21.1, 319, 318.1; 134/6; 320/104, 320/107
See application file for complete search history.

(56) References Cited

U.S. PATENT DOCUMENTS

| 5,646,494 | A | 7/1997 | Han |
| 2003/0028993 | A1 | 2/2003 | Song et al. |
| 2006/0087273 | A1 | 4/2006 | Ko et al. |
| 2008/0007203 | A1* | 1/2008 | Cohen et al. .................. 320/104 |

OTHER PUBLICATIONS

European Office Action mailed Jan. 10, 2013 in European Patent Application No. 10156573.7.

* cited by examiner

*Primary Examiner* — Robert Scruggs
(74) *Attorney, Agent, or Firm* — Staas & Halsey LLP

(57) ABSTRACT

A robot cleaner to perform a cleaning process by changing a traveling pattern according to a cleaning start position and a method for controlling the same are disclosed. The robot cleaner recognizes a current position of the robot cleaner upon receiving the automatic cleaning command. If the automatic cleaning process starts from the charger, the robot cleaner performs the automatic cleaning process using a conventional cleaning method. Otherwise, if the automatic cleaning process starts from the outside of the charger, the robot cleaner changes a traveling pattern, performs the spot cleaning process and then selectively performs the automatic cleaning process.

18 Claims, 8 Drawing Sheets

ROBOT CLEANER AND METHOD FOR CONTROLLING THE SAME

CROSS-REFERENCE TO RELATED APPLICATIONS

This application claims the benefit of Korean Patent Application No. 2009-0042029, filed on May 14, 2009 in the Korean Intellectual Property Office, the disclosure of which is incorporated herein by reference.

BACKGROUND

1. Field

Embodiments of the present invention relate to a robot cleaner which can change a traveling pattern thereof to new traveling pattern according to a cleaning start position and carrying out a cleaning process along the changed pattern, and a method for controlling the robot cleaner.

2. Description of the Related Art

Generally, a robot cleaner moves in a cleaning region without receiving a user's command, and sucks dust or dirty material from the bottom of the cleaning region so as to carry out a cleaning process in the cleaning region.

The robot cleaner repeatedly performs a cleaning process while moving along a predetermined traveling pattern to clean a given region. Representative traveling patterns include a lattice-shaped traveling pattern, a random traveling pattern, or the like. If the automatic cleaning command is received in the robot cleaner, the robot cleaner performs the cleaning process simultaneously while moving along a given traveling pattern (e.g., the lattice-shaped traveling pattern or the random traveling pattern). Generally, if the user wishes to control the robot cleaner to start a cleaning process from the outside of the charger, this means that the user wishes to remove dust gathered at a current position. However, a conventional robot cleaner is able to perform the cleaning process only along one traveling pattern (e.g., the lattice-shaped traveling pattern or the random traveling pattern) regardless of whether the automatic cleaning process starts from the position of the charger or if the automatic cleaning process starts from a position outside of the charger. Most robot cleaners move from their current positions to other positions, so that they are unable to first remove dust gathered in their current positions. As a result, the user must directly control the movement of the robot cleaner.

In order to prevent the above user inconvenience, although the conventional robot cleaner has adopted a spot function for preferentially cleaning a specific position (i.e., a position outside of the charger), most users may not know how to use the spot cleaning function or may not frequently use this spot cleaning process.

SUMMARY

Therefore, it is an aspect of the present invention to provide a robot cleaner and a control method thereof, which recognize a current position of a robot cleaner upon receiving an automatic cleaning command, change a traveling pattern according to a cleaning start position of the robot cleaner, thus selectively performing an automatic cleaning process or a spot cleaning process along the changed traveling pattern.

Additional aspects and/or advantages of the invention will be set forth in part in the description which follows and, in part, will be apparent from the description, or may be learned by practice of the invention.

The foregoing and/or other aspects of the present invention are achieved by providing a method of controlling a robot cleaner including recognizing a location of the robot cleaner, determining whether the recognized location of the robot cleaner is outside of a charger, and performing a spot cleaning process along a predetermined traveling pattern when determined the location of the robot cleaner is outside of the charger.

The performing of the spot cleaning process may include allowing the robot cleaner to preferentially clean a predetermined region at which the robot is presently located, along the predetermined traveling pattern.

The predetermined traveling pattern may include a square spiral traveling pattern, a curved spiral traveling pattern, or a zigzag traveling pattern.

The method may further include selectively performing an automatic cleaning process after performing the spot cleaning process.

The recognizing of the robot cleaner location may include determining whether a voltage is detected at a charging terminal of the robot cleaner contacting the charger, and determining that the robot cleaner is located outside of the charger when no voltage is detected at the charging terminal of the robot cleaner.

The recognizing of the robot cleaner location may include determining whether a voltage is detected at a charging terminal of the robot cleaner contacting the charger, and determining that the robot cleaner is located at the charger when the voltage is detected at the charging terminal.

The method may further include performing an automatic cleaning process according to a predetermined cleaning scheme when the robot cleaner is located at the charger.

The foregoing and/or other aspects of the present invention are achieved by providing a robot cleaner charged by a charger including a sensor detecting a cleaning start position of the cleaner, and a controller to determine whether the cleaning start position is outside of the charger, and to perform a spot cleaning process along a predetermined traveling pattern when determined the cleaning start position is outside of the charger.

The controller may clean a predetermined region at which the robot is presently located, along the predetermined traveling pattern.

The controller may perform the spot cleaning process to clean a predetermined region at which the robot cleaner is presently located, and may then stop the spot cleaning process after completely cleaning the predetermined region.

The controller may establish the predetermined region using either the number of rotations or a rotation radius of the traveling pattern.

The controller may selectively perform an automatic cleaning process after performing the spot cleaning process.

The robot cleaner may further include an input unit to input an automatic cleaning command. The controller may selectively perform the spot cleaning process or the automatic cleaning process according to a cleaning start position, upon receiving the automatic cleaning command from the input unit.

The controller may determine whether a voltage is detected at a charging terminal of the robot cleaner contacting the charger, and may determine that the robot cleaner is located outside of the charger when no voltage is detected at the charging terminal of the robot cleaner.

The controller may determine whether a voltage is detected at a charging terminal of the robot cleaner contacting the charger, and may determine that the robot cleaner is located at the charger when the voltage is detected at the charging terminal.

The controller may perform an automatic cleaning process using a predetermined cleaning scheme when the robot cleaner is located at the charger.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF EMBODIMENTS

Figure 1:
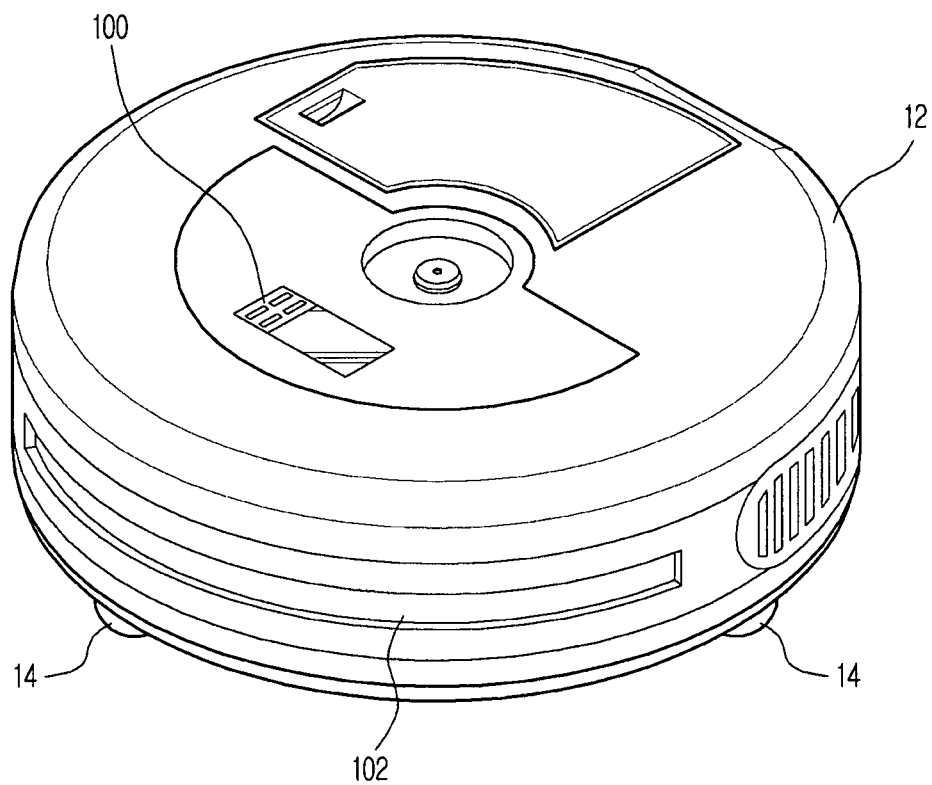
FIG. 1 is a perspective view illustrating the appearance of a robot cleaner according to the exemplary embodiments of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a perspective view illustrating the appearance of a robot cleaner according to an exemplary embodiment.

Referring to FIG. 1, a main body 12 forms the appearance of the robot cleaner 10. Drive wheels 14 (i.e. two) to move the robot cleaner 10 are spaced apart from each other by a predetermined distance, and are mounted to a lower part of the main body 12. Two more drive wheels 14 are selectively driven by a driver (motor) to drive each drive wheel 14, such that the robot cleaner 10 can move to a desired direction by the drive wheels 14. Optionally, a plurality of auxiliary wheels (not shown) may be located at the front and rear of the drive wheels 14, such that the auxiliary wheels support the main body 12 and facilitate traveling of the robot cleaner 10.

An input unit 100 to enter a moving traveling command or a cleaning command of the robot cleaner 10 is installed on the main body 12. A plurality of obstacle sensors 102 are installed at the circumference of the main body 12 so as to detect furniture, office equipment, and an obstacle, such as a wall, in a cleaning region.

Figure 2:
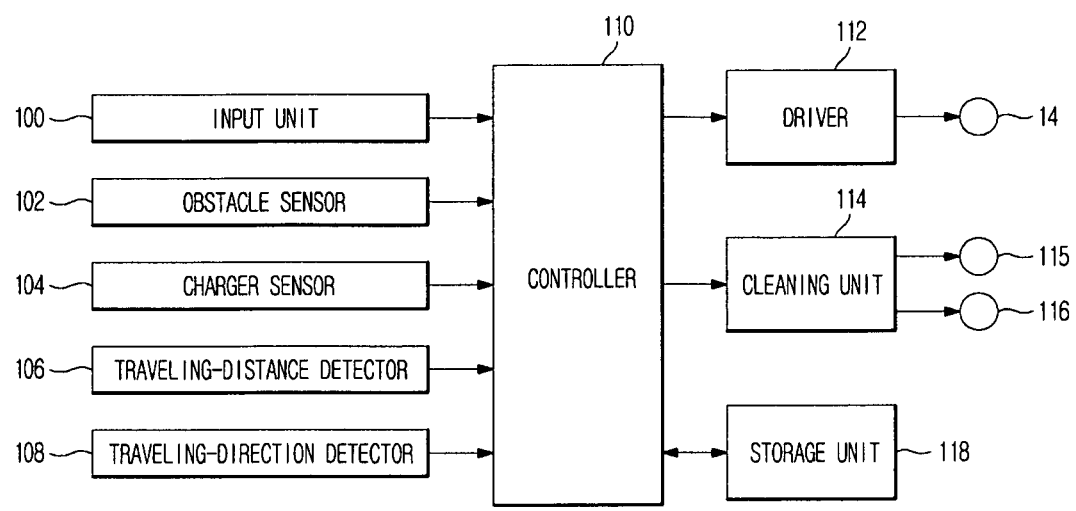
FIG. 2 is a block diagram illustrating a robot cleaner according to the exemplary embodiments.

FIG. 2 is a block diagram illustrating a robot cleaner according to an exemplary embodiment. Referring to FIG. 2, the robot cleaner includes the input unit 100, the obstacle sensor 102, a charger sensor 104, a traveling-distance detector 106, a traveling-direction detector 108, a controller 110, a driver 112, a cleaning unit 114, and a storage unit 118.

The input unit 100 includes a plurality of buttons located either at the top or at a remote-controller (not shown), to receive the moving traveling command or the cleaning command (automatic cleaning command or partial cleaning command) of the robot cleaner 10.

The obstacle sensor 102 detects furniture, office equipment, and an obstacle such as a wall in the range of a cleaning region in which the robot cleaner 10 moves. The obstacle sensor 102 transmits ultrasonic waves to a traveling path of the robot cleaner 10, and receives ultrasonic waves reflected from an obstacle, to detect the presence or absence of an obstacle in the traveling path and a distance to the obstacle. In this case, the obstacle sensor 102 includes a plurality of infrared light emitting elements and a plurality of infrared light receiving elements, to emit infrared rays and receive the reflected infrared rays. For example, the obstacle sensor 120 may be formed of an infrared sensor.

In order to determine whether the robot cleaner 10 starts an automatic cleaning process at the position of a charger 20 (i.e., a docking station), the charger sensor 104 detects a voltage of a charging terminal contacting the charger 20 installed in a cleaning region in which the robot cleaner 10 moves, to recognize a current position of the robot cleaner 10. If the voltage is detected at the charging terminal, it is determined that the robot cleaner 10 is located at the charger 20. If no voltage is detected at the charging terminal after the robot cleaner 10 is lifted up at least one time, it is determined that a current position of the robot cleaner does not correspond to the charger 20. If no voltage is detected at the charging terminal after the moving traveling command of the robot cleaner 10 is carried out by a remote-controller or the like, it is determined that a current position of the robot cleaner does not correspond to the charger 20.

The charger 20 is installed in a cleaning region in which the robot cleaner 10 moves, and converts commercial AC power into a power source required to drive the robot cleaner 10. If the charging terminal of the robot cleaner 10 is brought into contact with the charger 20, the power source required to drive the robot cleaner 10 is charged in a battery.

The traveling-distance detector 106 detects a traveling distance of the robot cleaner 10, measures the rotation of both drive wheels 14 installed for the movement of the robot cleaner 10 using an encoder or the like, and detects traveling distance information of the robot cleaner 10.

The traveling-direction detector 108 detects a rotation angle of the robot cleaner 10. If an obstacle is detected on a traveling path of the robot cleaner 10, a rotation angle sensor such as a gyro-sensor or an encoder mounted to both wheels 14 is used to detect the rotation angle of the robot cleaner 10 starting from the obstacle.

The controller 110 controls all operations of the robot cleaner 10. If an automatic cleaning command is received in the robot cleaner 10, a current position of the robot cleaner 10 is recognized by the charger sensor 104, to determine whether an automatic cleaning process starts from the location of the charger 20 or from the outside of the charger. If the robot cleaner 10 starts the automatic cleaning process at the location of the charger 20, the automatic cleaning process is carried out according to a conventional cleaning process. If the robot cleaner 10 starts the automatic cleaning process at the outside of the charger 20, a spot cleaning process is carried out along a traveling pattern (e.g., a curved spiral traveling pattern or a square spiral traveling pattern) established for the spot cleaning process. As a result, although a user does not push a spot cleaning button at a spot-cleaning-desired position, the robot cleaner 10 is controlled to first clean a specific position where much dust is gathered.

If the robot cleaner 10 starts the automatic cleaning process at the outside of the charger 20, the controller 110 controls the robot cleaner 10 to first carry out along a traveling pattern established for the spot cleaning process and then carry out the automatic cleaning process using a conventional cleaning method, or the controller 110 selectively controls the execution of the automatic cleaning process to immediately complete the cleaning process.

If the controller 110 starts the automatic cleaning process at the outside of the charger 20, it starts the spot cleaning process along a traveling pattern established for the spot cleaning process, and stops the spot cleaning process after covering a predetermined area.

The driver 112 drives both driving wheels 14 installed under the main body 12 of the robot cleaner on the basis of position information recognized by the controller and obstacle information detected by the obstacle sensor 102, such that the robot cleaner 10 automatically moves in a given cleaning region without colliding with a wall or obstacle, and at the same time changes its moving direction to another direction.

Upon receiving a control signal from the controller 110, the cleaning unit 114 drives a suction motor 115 and a brush motor 116 to suck dust or dirty material from the bottom of a cleaning region in which the robot cleaner 10 moves.

The storage unit 118 stores a predetermined traveling pattern depending on a cleaning start position of the robot cleaner 10, obstacle information detected in the traveling process of the robot cleaner 10, and a setup value (e.g., the number of rotations of a pattern suitable for the spot cleaning, or a rotation radius of the pattern).

The above-mentioned robot cleaner, a control method thereof, and operation effects will hereinafter be described.

Figure 3:
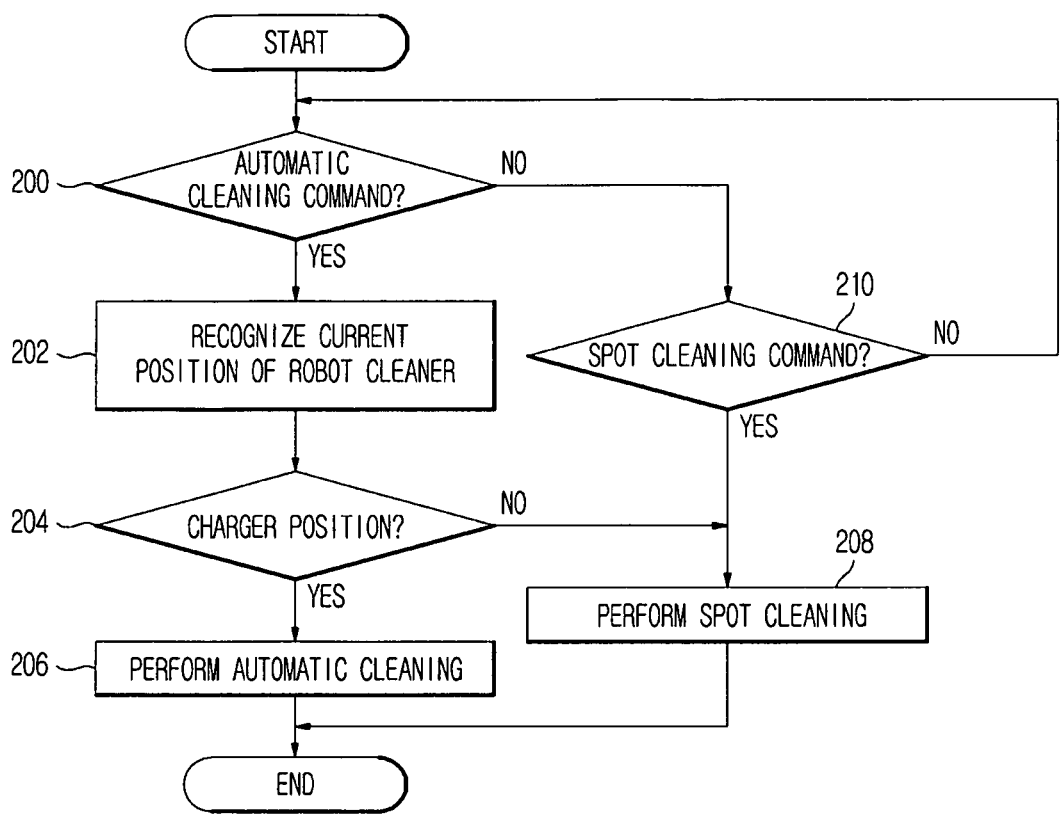
FIG. 3 is a flow chart illustrating a method for controlling a robot cleaner according to a first exemplary embodiment.

FIG. 3 is a flow chart illustrating a method for controlling a robot cleaner according to an exemplary embodiment.

Referring to FIG. 3, if a user enters a cleaning command (automatic cleaning command or spot cleaning command) of the robot cleaner 10 through the input unit 100, the controller 110 receives a cleaning command (automatic cleaning command or spot cleaning command) entered through the input unit 100 and determines whether the automatic cleaning command is received at operation S200.

At operation S200, upon receiving the automatic cleaning command, the controller 110 recognizes a current position of the robot cleaner 10 through the charger sensor 104 at operation S202.

A variety of methods may be used to enable the controller 110 to recognize a current position of the robot cleaner 10. For example, it is determined whether a voltage is detected at a charging terminal contacting the charger 20 installed in a cleaning region in which the robot cleaner 10 moves. If the voltage is detected at the charging terminal, the controller 110 determines that the robot cleaner 10 is located at the charger 20. Otherwise, if no voltage is detected at the charging terminal, the controller 110 determines that the robot cleaner 10 is located outside of the charger 20.

If the voltage is detected at the charging terminal after the robot cleaner 10 is lifted up by a user at least one time, it is determined that the robot cleaner 10 is located at the charger 20. If no voltage is detected at the charging terminal after the robot cleaner 10 is lifted up at least one time, it is determined that the robot cleaner 10 is located outside of the charger 20.

Also, the controller 110 detects a manual moving command input to the robot cleaner 10, such that a moving traveling command of the robot cleaner 10 is carried out using a remote-controller or the like. If a voltage is detected at the charging terminal, it is determined that the robot cleaner 10 is located at the charger 20. If no voltage is detected at the charging terminal, it is determined that the robot cleaner 10 is located outside of the charger 20.

Figure 5:
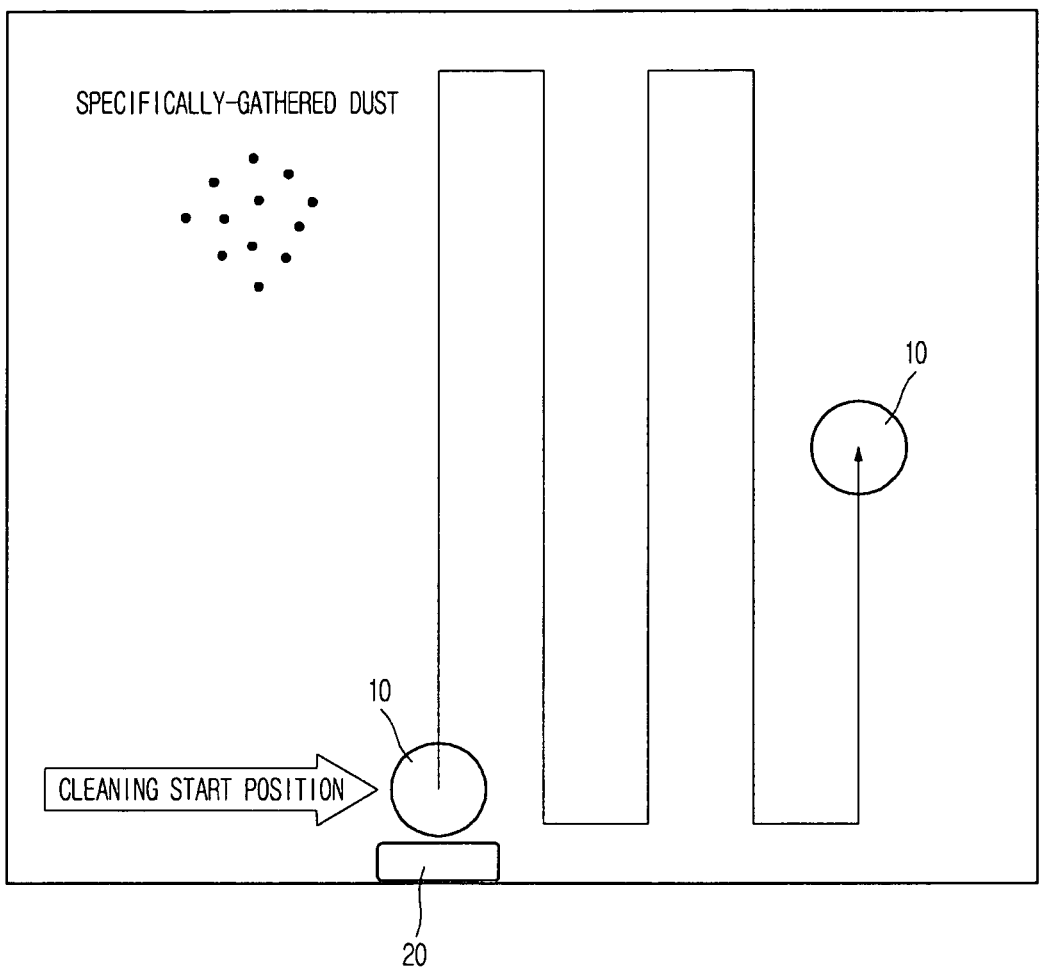
FIG. 5 illustrates a first traveling locus for an automatic cleaning process of a robot cleaner according to an exemplary embodiment.
Figure 6:
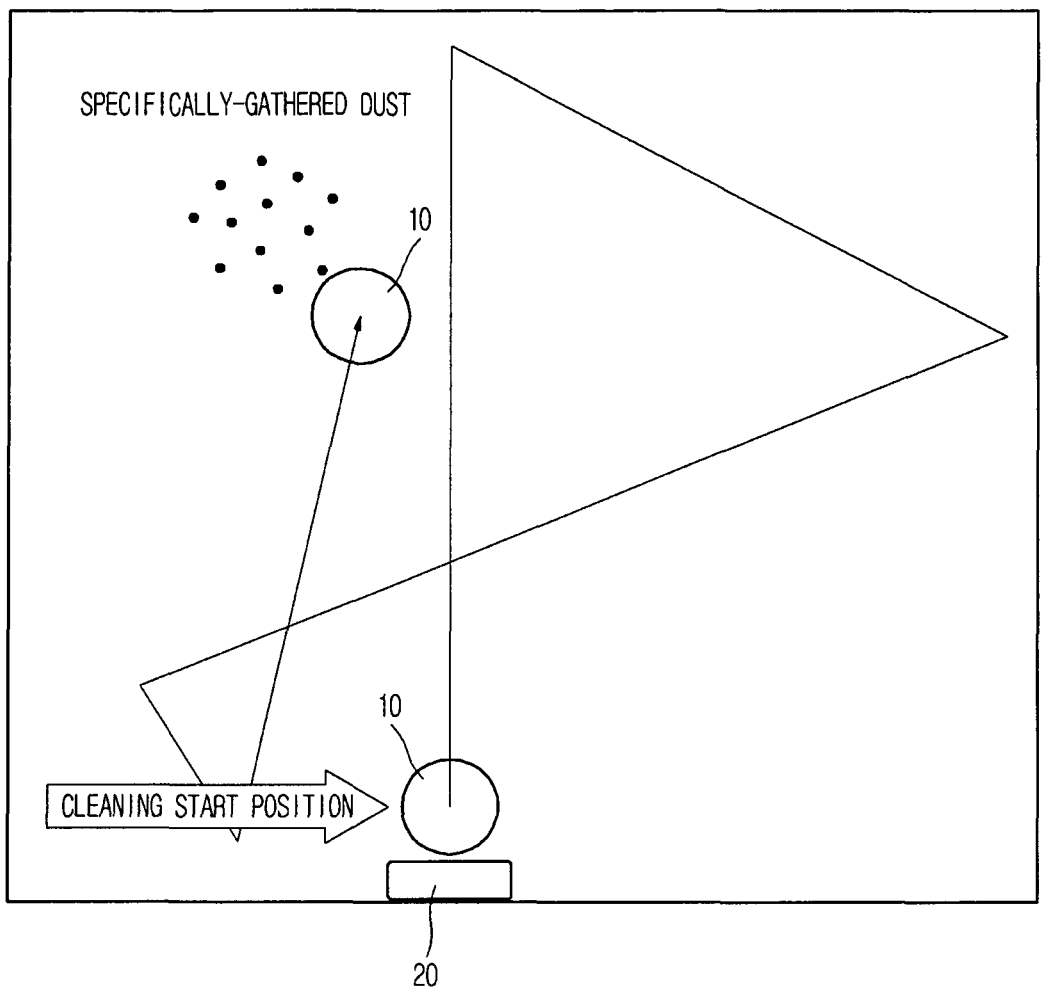
FIG. 6 illustrates a second traveling locus for an automatic cleaning process of a robot cleaner according to an exemplary embodiment.

In order to determine whether the robot cleaner 10 starts from the outside of the charger 20, the controller 110 determines whether a current position of the robot cleaner 10 corresponds to a charger 20 at operation S204. If it is determined that the current position of the robot cleaner 10 corresponds to the charger 20, the automatic cleaning process is carried out using the conventional cleaning method as shown in FIGS. 5 and 6 at operation S206.

The automatic cleaning based on the conventional cleaning method means that the robot cleaner 10 drives the suction motor 115 and the brush motor 116 through the cleaning unit 114 while moving through random traveling, pattern traveling (e.g., zigzag traveling) or position recognition, such that the robot cleaner 10 sucks dust or dirty material from the bottom of a cleaning region in which the robot cleaner 10 moves.

Figure 7:
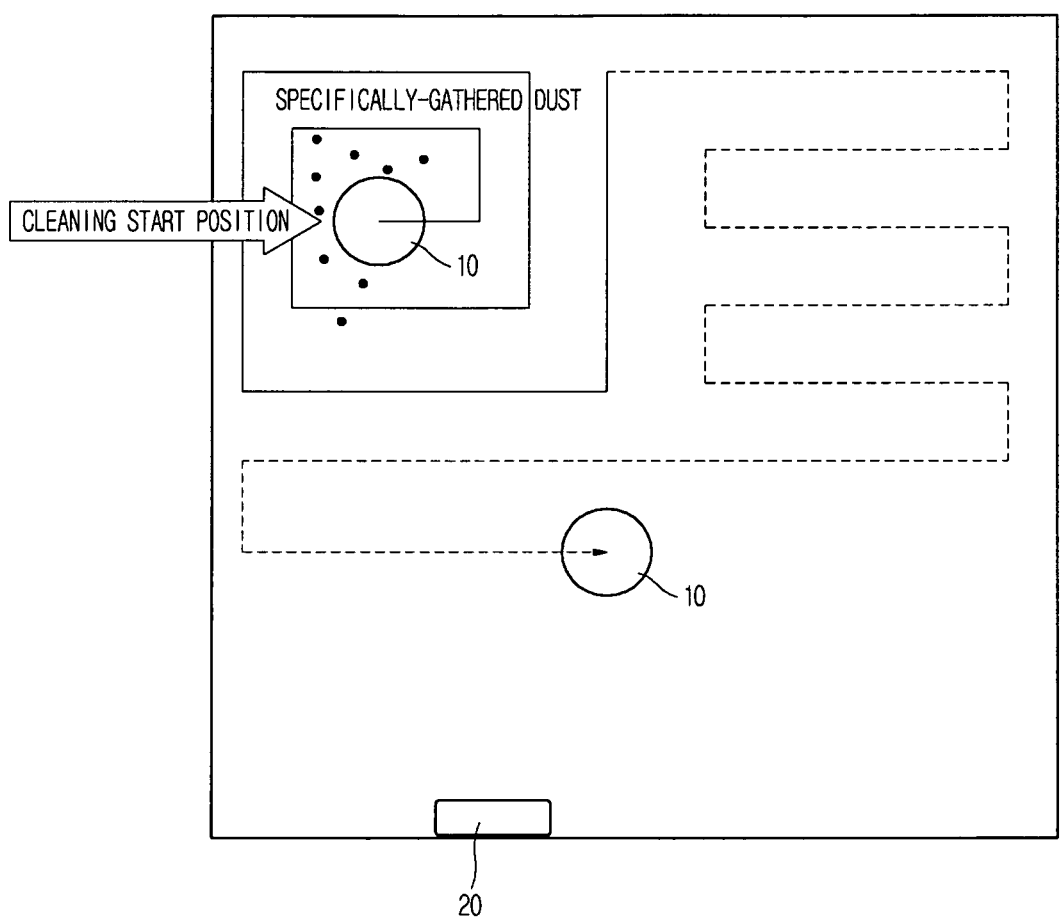
FIG. 7 illustrates a first traveling locus for a spot cleaning process of a robot cleaner according to an exemplary embodiment.
Figure 8:
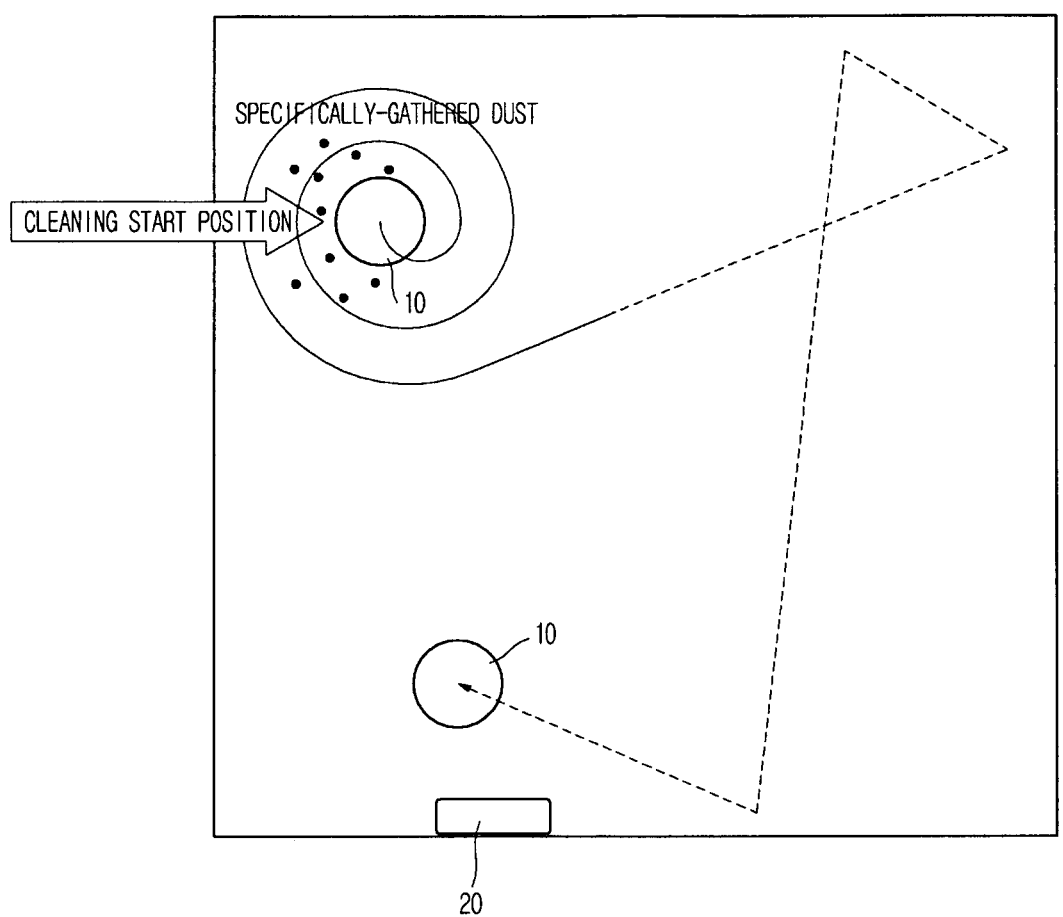
FIG. 8 illustrates a second traveling locus for a spot cleaning process of a robot cleaner according to an exemplary embodiment.

If the robot cleaner 10 is located outside of the charger 20 at operation S204, the controller 110 controls the robot cleaner 10 to move along a given traveling pattern appropriate for a spot cleaning process (e.g., a square spiral traveling pattern or a curved spiral traveling pattern) as shown in FIGS. 7 and 8, and drives the suction motor 115 and the brush motor 116 through the cleaning unit 114, to perform a spot cleaning process to preferentially remove dust gathered in a certain region where the robot cleaner 10 is presently located at operation S208.

In this case, if spot cleaning is performed on a predetermined region where the robot cleaner 10 is located, the spot cleaning is stopped. In order to decide the predetermined region to stop the spot cleaning operation, the number of rotations or a rotation radius of a square spiral traveling pattern or curved spiral traveling pattern is pre-established and it is determined whether the spot cleaning is completely performed in the predetermined region. In addition, if dust is not detected within a predetermined time while the robot cleaner 10 performs the spot cleaning along the square or curved spiral traveling pattern, it is determined that the spot cleaning has been completed, so that the spot cleaning operation may be stopped.

In the meantime, if the automatic cleaning command is not received at operation S200, the controller 110 determines whether the spot cleaning command is received at operation S210. Upon receiving the spot cleaning command, the controller 110 goes to operation S208, controls the robot cleaner 10 to move along the square or curved spiral traveling pattern (See FIG. 7 or 8) appropriate for the spot cleaning process, and drives the suction motor 115 and the brush motor 116 through the cleaning unit 114, to perform a spot cleaning process to preferentially remove dust gathered in a certain region where the robot cleaner 10 is presently located.

Figure 4:
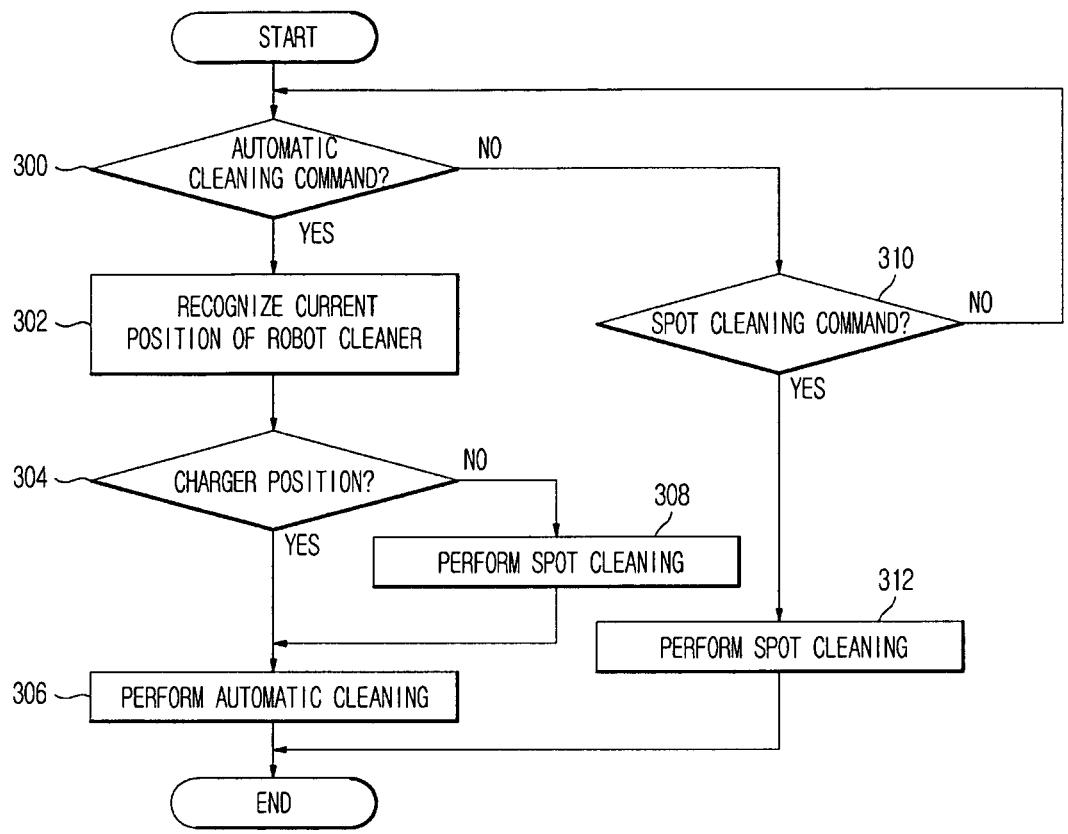
FIG. 4 is a flow chart illustrating a method for controlling a robot cleaner according to a second exemplary embodiment.

FIG. 4 is a flow chart illustrating a method for controlling a robot cleaner according to another exemplary embodiment.

Referring to FIG. 4, if a user enters a cleaning command (automatic cleaning command or spot cleaning command) of the robot cleaner 10 through the input unit 100, the controller 110 receives a cleaning command (automatic cleaning command or spot cleaning command) entered through the input unit 100 and determines whether the automatic cleaning command is received at operation S300.

At operation S300, upon receiving an automatic cleaning command, the controller 110 recognizes a current position of the robot cleaner 10 through the charger sensor 104 at operation S302, and determines whether the robot cleaner 10 is presently located at the charger 20.

If it is determined that the current position of the robot cleaner 10 corresponds to the charger 20 at operation S304, the automatic cleaning process is carried out using the conventional cleaning method as shown in FIGS. 5 and 6 at operation S306.

On the other hand, if the robot cleaner 10 is located outside of the charger 20 at operation S304, the controller 110 controls the robot cleaner 10 to move along a given traveling pattern appropriate for a spot cleaning process (e.g., a square spiral traveling pattern or a curved spiral traveling pattern) as shown in FIGS. 7 and 8, and drives the suction motor 115 and the brush motor 116 through the cleaning unit 114, to perform a spot cleaning process to preferentially remove dust gathered in a certain region where the robot cleaner 10 is presently located at operation S308, and goes to operation S306 to perform the automatic cleaning process based on the conventional cleaning method.

The operations to perform the automatic cleaning process based on the conventional cleaning method after performing the spot cleaning process may be optionally carried out as denoted by a dotted line of FIG. 8.

If the automatic cleaning command is not received at step S300, the controller 110 determines whether the spot cleaning command is received at operation 310. Upon receiving the spot cleaning command, the controller 110 controls the robot cleaner 10 to move along a given traveling pattern appropriate for a spot cleaning process (e.g., a square spiral traveling pattern or a curved spiral traveling pattern) as shown in FIGS. 7 and 8, and drives the suction motor 115 and the brush motor 116 through the cleaning unit 114, to perform a spot cleaning process to preferentially remove dust gathered in a certain region where the robot cleaner 10 is presently located at operation S312.

Although the embodiments of the present invention have disclosed the method for allowing the robot cleaner 10 to perform the spot cleaning process in a given region where the robot cleaner 10 is presently located using a square spiral traveling pattern or a curved spiral traveling pattern, the exemplary embodiments of the present invention are not limited thereto. The same purpose and effects of the embodiments of the present invention can be achieved even when the robot cleaner performs the spot cleaning process in a given region where the robot cleaner 10 is presently located along a zigzag traveling pattern having a predetermined interval (e.g., a narrow interval) corresponding to a predetermined distance.

In addition, although the embodiments of the present invention have exemplarily disclosed that the spot cleaning process is carried out when the user enters the automatic cleaning command of the robot cleaner 10 through the input unit 100 and it is determined that the robot cleaner 10 is presently located outside of the charger 20, the scope of the embodiments of the present invention is not limited thereto. Even if the user has not entered an additional cleaning command through the input unit 100, if the robot cleaner 10 determines that the automatic cleaning process is needed, the spot cleaning process or the automatic cleaning process may be optionally performed according to a current position of the robot cleaner 10.

As is apparent from the above description, the robot cleaner according to the embodiment of the present invention recognizes a current position of the robot cleaner upon receiving the automatic cleaning command. If the automatic cleaning process starts from the charger, the robot cleaner performs the automatic cleaning process using a conventional cleaning method. Otherwise, if the automatic cleaning process starts from the outside of the charger, the robot cleaner changes a traveling pattern, first performs the spot cleaning process and then selectively performs the automatic cleaning process. As a result, although the user does not press the spot cleaning button at a spot cleaning position, the robot cleaner can preferentially clean a specific position where much dust is gathered.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a robot cleaner comprising:
   receiving a command to perform a cleaning process;
   recognizing, in response to the received command, a cleaning start location of the robot cleaner relative to a charger;
   determining, by a controller, whether the recognized cleaning start location of the robot cleaner is at the charger; and
   performing a spot cleaning process along a predetermined traveling pattern if it is determined the recognized cleaning start location is away from the charger,
   wherein the recognizing of the cleaning start location of the robot cleaner includes:
      determining whether a voltage is detected at a charging terminal of the robot cleaner, the charging terminal being used to charge a battery of the robot cleaner when the charging terminal contacts the charger, and
      determining that the robot cleaner is located away from the charger when no voltage is detected at the charging terminal.

2. The method according to claim 1, wherein the performing of the spot cleaning process includes first cleaning a region at which the robot is presently located, along the predetermined traveling pattern.

3. The method according to claim 2, wherein the predetermined traveling pattern includes a square spiral traveling pattern, a curved spiral traveling pattern, or a zigzag traveling pattern.

4. The method according to claim 1, further comprising: selectively performing an automatic cleaning process after performing the spot cleaning process.

5. The method according to claim 1, wherein the recognizing of the robot cleaner location includes:
   determining whether a voltage is detected at a charging terminal of the robot cleaner, the charging terminal being used to charge a battery of the robot cleaner when the charging terminal contacts the charger, and
   determining that the robot cleaner is located at the charger when the voltage is detected at the charging terminal.

6. The method according to claim 5, further comprising: performing an automatic cleaning process according to a predetermined cleaning scheme.

7. A robot cleaner charged by a charger, comprising:
   an input unit to receive a command to perform a cleaning process;
   a sensor to detect, in response to the received command, a cleaning start position of the cleaner relative to the charger; and
   a controller to determine whether the detected cleaning start position is at the charger, and to perform a spot cleaning process along a predetermined traveling pattern if it is determined the detected cleaning start position is away from the charger, wherein the cleaning start location of the robot cleaner is detected by determining whether a voltage is detected at a charging terminal of the robot cleaner, the charging terminal being used to charge a battery of the robot cleaner when the charging terminal contacts the charger, and the controller determines that the robot cleaner is located away from the charger when no voltage is detect at the charging terminal.

8. The robot cleaner according to claim 7, wherein the controller first cleans a predetermined region at which the robot is presently located, along the predetermined traveling pattern.

9. The robot cleaner according to claim 8, wherein the controller performs the spot cleaning process to clean the predetermined region at which the robot cleaner is presently located, and then stops the spot cleaning process after completely cleaning the predetermined region.

10. The robot cleaner according to claim 9, wherein the controller establishes the predetermined region using either a number of rotations or a rotation radius of the traveling pattern.

11. The robot cleaner according to claim 8, wherein the controller selectively performs an automatic cleaning process after performing the spot cleaning process.

12. The robot cleaner according to claim 7, wherein the controller selectively performs the spot cleaning process or an automatic cleaning process according to the cleaning start position, upon receiving the command to perform the cleaning process from the input unit.

13. The robot cleaner according to claim 7, wherein the controller determines that the robot cleaner is located at the charger when the voltage is detected at the charging terminal.

14. The robot cleaner according to claim 13, wherein the controller performs an automatic cleaning process using a predetermined cleaning scheme when determined that the robot cleaner is located at the charger.

15. A method of controlling a robot cleaner comprising:
receiving, by a controller, a command to perform a cleaning process;
recognizing, in response to the received command, a current position of the robot cleaner relative to a charger by detecting a voltage detected at a charging terminal of the robot cleaner, using a charging sensor;
determining, by the controller, whether the robot cleaner is positioned away from the charger or at the charger based on the detected voltage; and
performing an automatic cleaning process if it is determined the recognized position is at the charger by cleaning a predetermined region along a first predetermined traveling pattern, and performing a spot cleaning process if it is determined the recognized position is away from the charger by cleaning a preferential region along a second predetermined traveling pattern,
wherein the charging terminal is used to charge a battery of the robot cleaner when the charging terminal contacts the charger,
wherein the recognizing of the robot cleaner location includes:
determining whether a voltage is detected at a charging terminal of the robot cleaner, the charging terminal beinq used to charge a battery of the robot cleaner when the charging terminal contacts the charger, and
determining that the robot cleaner is located away from the charger when no voltage is detected at the charging terminal.

16. The method according to claim 15, wherein the performing a spot cleaning process further includes performing the spot cleaning process at the current position of the robot cleaner and performing an automatic cleaning process after performing the spot cleaning process.

17. The method according to claim 15, wherein the voltage of the charging terminal is detected after a user lifts the robot cleaner up at least one time.

18. The method according to claim 15, wherein the voltage of the charging terminal is detected and the current position of the robot cleaner recognized, in response to detecting a manual moving command from a user.

* * * * *

UNITED STATES PATENT AND TRADEMARK OFFICE
CERTIFICATE OF CORRECTION

PATENT NO.        : 8,584,306 B2                                 Page 1 of 1
APPLICATION NO.   : 12/659401
DATED             : November 19, 2013
INVENTOR(S)       : Chung et al.

It is certified that error appears in the above-identified patent and that said Letters Patent is hereby corrected as shown below:

In the Claims

In Column 10, Line 22, In Claim 15, delete "beinq" and insert -- being --, therefor.

Signed and Sealed this
Twenty-fifth Day of March, 2014

Michelle K. Lee
*Deputy Director of the United States Patent and Trademark Office*